US008984487B2

(12) United States Patent
Houck et al.

(10) Patent No.: US 8,984,487 B2
(45) Date of Patent: Mar. 17, 2015

(54) RESOURCE TRACKER

(75) Inventors: Brian J. Houck, Bothell, WA (US);
Timothy C. Franklin, Woodinville, WA (US); Cameron B. Lerum, Renton, WA (US); Jan Anders Nelson, Gig Harbor, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

(21) Appl. No.: 13/617,815

(22) Filed: Sep. 14, 2012

(65) Prior Publication Data

US 2014/0082582 A1 Mar. 20, 2014

(51) Int. Cl.
*G06F 9/44* (2006.01)

(52) U.S. Cl.
USPC ............ 717/125; 717/105; 717/109; 717/113

(58) Field of Classification Search
CPC ...................................................... G06Q 10/06
USPC .................................................. 717/101–135
See application file for complete search history.

(56) References Cited

U.S. PATENT DOCUMENTS

| 7,673,299 | B2 | 3/2010 | Bennett et al. | |
|---|---|---|---|---|
| 7,725,496 | B2 | 5/2010 | Paval | |
| 8,244,846 | B2 | 8/2012 | Wong et al. | |
| 2002/0078432 | A1* | 6/2002 | Charisius et al. | 717/102 |
| 2002/0107914 | A1* | 8/2002 | Charisius et al. | 709/203 |
| 2002/0184610 | A1* | 12/2002 | Chong et al. | 717/109 |
| 2003/0106039 | A1* | 6/2003 | Rosnow et al. | 717/100 |
| 2006/0225068 | A1* | 10/2006 | Bennett et al. | 717/168 |
| 2007/0027810 | A1* | 2/2007 | Longnecker et al. | 705/51 |
| 2007/0162595 | A1 | 7/2007 | Samprathi | |
| 2011/0093701 | A1 | 4/2011 | Etchegoyen | |
| 2011/0107297 | A1* | 5/2011 | Chandra et al. | 717/110 |

OTHER PUBLICATIONS

Herbsleb, James D., et al. "An empirical study of global software development: distance and speed." Proceedings of the 23rd international conference on Software Engineering. IEEE computer Society, 2001. pp. 81-90.*
Vetter, Jeffrey S., and Bronis R. de Supinski. "Dynamic software testing of MPI applications with Umpire." Supercomputing, ACM/IEEE 2000 Conference. IEEE, 2000. pp. 1-10.*
Basili, Victor R., and John D. Musa. "The future engineering of software: A management perspective." IEEE Computer 24.9 (1991): pp. 90-96.*

(Continued)

*Primary Examiner* — Satish Rampuria
(74) *Attorney, Agent, or Firm* — Kevin Sullivan; Kate Drakos; Micky Minhas (57) ABSTRACT

Resource tracker techniques are described in which resource trackers may be generated, assigned to resources, and used to track resources throughout a development environment. The resource trackers may be configured in a designated format that is suitable to distinguish different resources one from one another. In one approach, resource trackers are derived as a combination of a user-supplied project identifier and defined resource identifiers. Resource trackers may be embedded into code defining corresponding resources and exposed to identify resources in connection with various development operations. In an embodiment, the resources trackers may be employed to provide visual indications of resources that appear within a user-interface for a project that is output for testing. A developer may identify resources based on resource trackers exposed via the user-interface and navigate back to underlying code in various ways to address any issues identified through the testing.

20 Claims, 7 Drawing Sheets

(56) References Cited

OTHER PUBLICATIONS

McCaffrey, James "Automating UI Tests in WPF Applications", Retrieved from <http://msdn.microsoft.com/en-us/magazine/dd483216.aspx>, (Mar. 4, 2009), 10 pages.

Safar, Libor et al., "Best Practices in Localization Testing", *Multilingual*, vol. 21 Issue 1, Retrieved from <http://www.moravia.com/files/download/Best_Practices_in_Localization_Testing.pdf>,(Feb. 2010), 5 pages.

\* cited by examiner

RESOURCE TRACKER

BACKGROUND

One challenge associated with developing applications is keeping track of various resources used in the development process. Some developers may have several ongoing projects that may use some common resource identifiers, which can make it difficult to know for certain which resource is being manipulated at a given time for a particular development task. The difficulty may be compounded when resources are transformed through different operations to produce different resource versions. One example of such an operation is translation of a project and corresponding resources into multiple languages which may generate language specific resources for each language. To fix a problem discovered during testing, for instance, a developer using traditional techniques may be forced to manually examine and cross-reference different resources across projects to correctly identify a particular resource as the source of the problem, which may be time consuming and frustrating to the developer.

SUMMARY

Resource tracker techniques are described in which resource trackers may be generated, assigned to resources, and used to track resources throughout a development environment. The resource trackers may be configured in a designated format that is suitable to distinguish different resources one from one another. In one approach, resource trackers are derived as a combination of a user-supplied project identifier and defined resource identifiers within the system. Resource trackers may be embedded into code defining corresponding resources and exposed to identify resources in connection with various development operations. In an embodiment, the resources trackers may be employed to provide visual indications of resources that appear within a user-interface for a project that is output for testing. A developer may identify resources based on resource trackers exposed via the user-interface and navigate back to underlying code in various ways to address any issues identified through the testing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Resource tracker techniques are described in which resource trackers may be generated, assigned to resources, and used to track resources throughout a development process. The resource trackers may be configured in a designated format that is suitable to distinguish different resources one from one another. In one approach, resource trackers are derived as a combination of a user-supplied project identifier and resource identifiers defined for individual resources. Resource trackers may be embedded into code defining corresponding resources and exposed to identify resources in connection with various development operations. In an embodiment, the resources trackers may be employed to provide visual indications of resources that appear within a user-interface for a project that is output for testing. A developer may identify resources based on resource trackers exposed via the user-interface and navigate back to underlying code in various ways to address any issues identified through the testing.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Lastly, an example system and components of the system are described that can be employed in one or more embodiments.

Example Operating Environment

Figure 1:
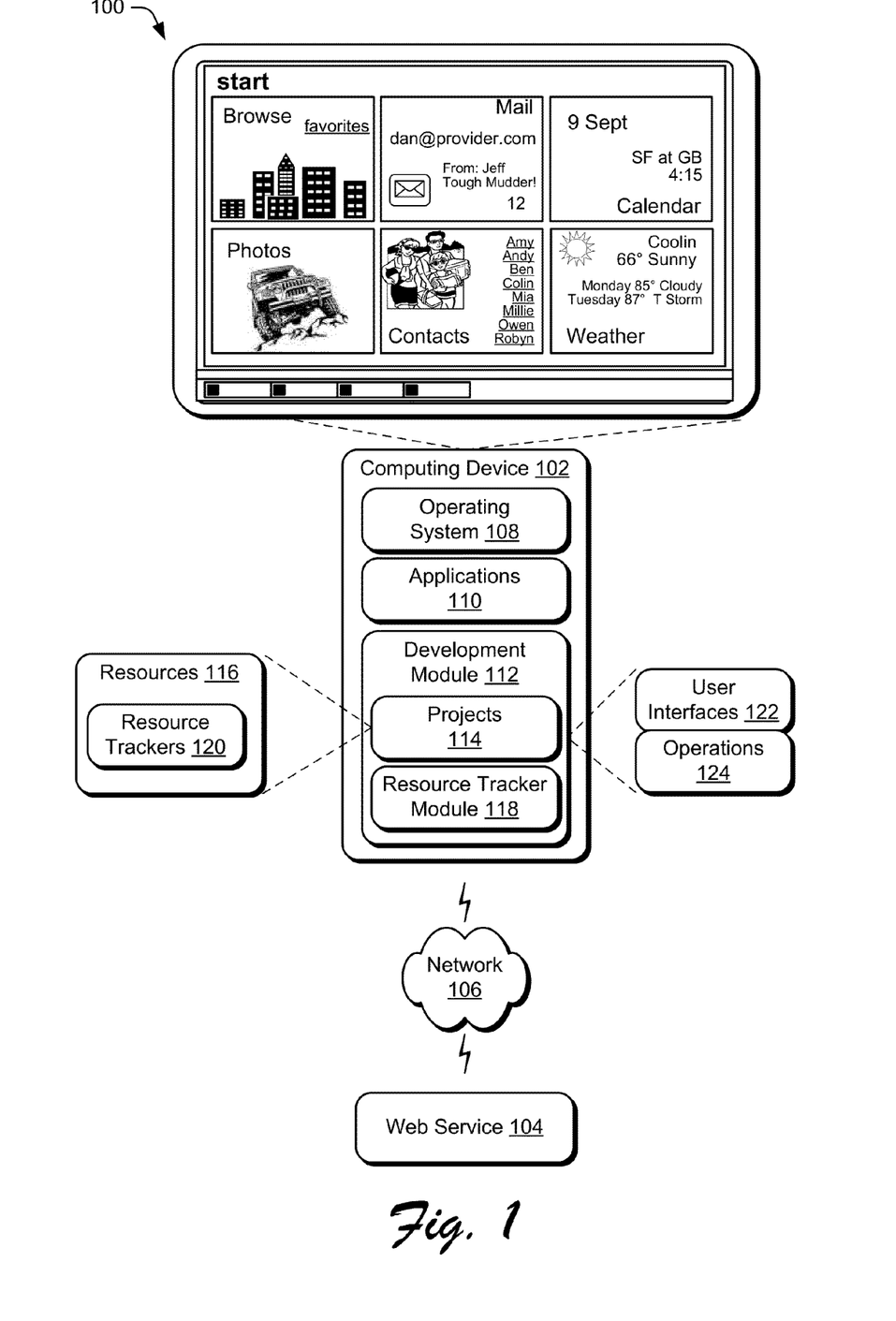
FIG. 1 is an illustration of an environment in an example implementation that is operable to implement resource tracker techniques.

FIG. 1 is an illustration of an environment 100 in an example implementation that is operable to employ techniques described herein. The illustrated environment 100 includes a computing device 102 and a web service 104 that are communicatively coupled via a network 106. The computing device 102 and the web service 104 may each be implemented by a wide range of computing devices.

For example, a computing device 102 may be configured as a computer that is capable of communicating over the network 106, such as a desktop computer, a mobile station, an entertainment appliance, a tablet or slate device, a surface computing device, a set-top box communicatively coupled to a display device, a mobile communication device (e.g., a wireless phone), a game console, and so forth. The computing device 102 may be configured as any suitable computing system and/or device that employ various processing systems, some additional examples of which are discussed in relation to the example system of FIG. 7.

The computing device 102 is further illustrated as including an operating system 108. Generally speaking, the operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device without understanding how this rendering will be performed. The operating system 108 may provide various services, interfaces, and functionality that applications 110 may invoke to take advantage of system features. A variety of applications 110 to provide a wide range of functionality to the computing device 102 are contemplated including but not limited to a browser, an office productivity application, an email client, a multi-media management program, device management software, a software development environment, and networking applications, to name a few examples.

The operating system 108 may also represent a variety of other functionality, such as to manage a file system and a user interface that is navigable by a user of the computing device 102. An example of this is illustrated as the user interface configured as an application launcher or start screen (e.g., desktop) for the computing device 102 that is depicted in FIG. 1. The representations or tiles as shown in the illustrated example are selectable to launch a corresponding one of the applications 110 for execution on the computing device 102. In this way, a user may readily navigate through a file structure and initiate execution of applications of interest.

The computing device 102 also includes a development module 112 that represents functionality operable to provide an integrated development environment (IDE) for development of applications 110. The development module 112 generally provides application lifecycle management including support for design, development, testing, and/or deployment of applications. The development module 112 may support different programming languages and integrate different components to simplify application development such as a code editor, a compiler, build automation tools, a debugger, and so forth. Thus, the development module 112 provides functionality for a developer to create/edit resources 116 for projects 114 (e.g., create source content) and compile the resources 116 to build an application 110.

In accordance with techniques described herein, the development module 112 may include or otherwise make use of a resource tracker module 118. The resource tracker module 118 represents functionality operable to generate resource trackers 120 and associate the resource trackers with resources 116 to facilitate tracking of the resources throughout an IDE. This includes, but is not limited to, exposing resource trackers 120 within user interfaces 122 tested through the IDE to provide visual indications of resources that are rendered in the user-interface. Resource trackers 120 may also be listed along with corresponding resources 116 in a resource database, an editing interface, a resource table, menus, drop-down lists, and/or other tools, UIs or controls supplied through the IDE to manage projects 114 and enable interaction with corresponding resources 116. Thus, a developer may be presented with resource trackers 120 throughout an IDE in connection with different operations associated with application development and/or within various corresponding user interfaces output to enable interaction with the resources. The developer may use the resource trackers to quickly recognize and distinguish between different resources in the development process.

Resource trackers 120 may be formatted in various ways, examples of which are discussed in relation to the following figures. In general, resource trackers may be generated at different times and in connection with different operations 124 that may be performed in the course of developing an application. For example, resource trackers may be assigned to resources 116 when the resources are compiled, translated into different language, rendered for display in a user interface, and/or in connection with other operations 124 performed on the resources to develop and test a corresponding application.

Having considered an example operating environment, consider now some example resource tracker procedures in accordance with one or more embodiments.

Resource Tracker Details

The following discussion describes details of resource tracker techniques that may be implemented utilizing the previously described systems and devices. Resource tracker details are described in relation to example procedures that may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the example environment discussed above. In at least some embodiments, the procedures may be performed by a suitably configured computing device, such as the example computing device 102 of FIG. 1 that includes or otherwise makes use of a resource tracker module 118.

Figure 2:
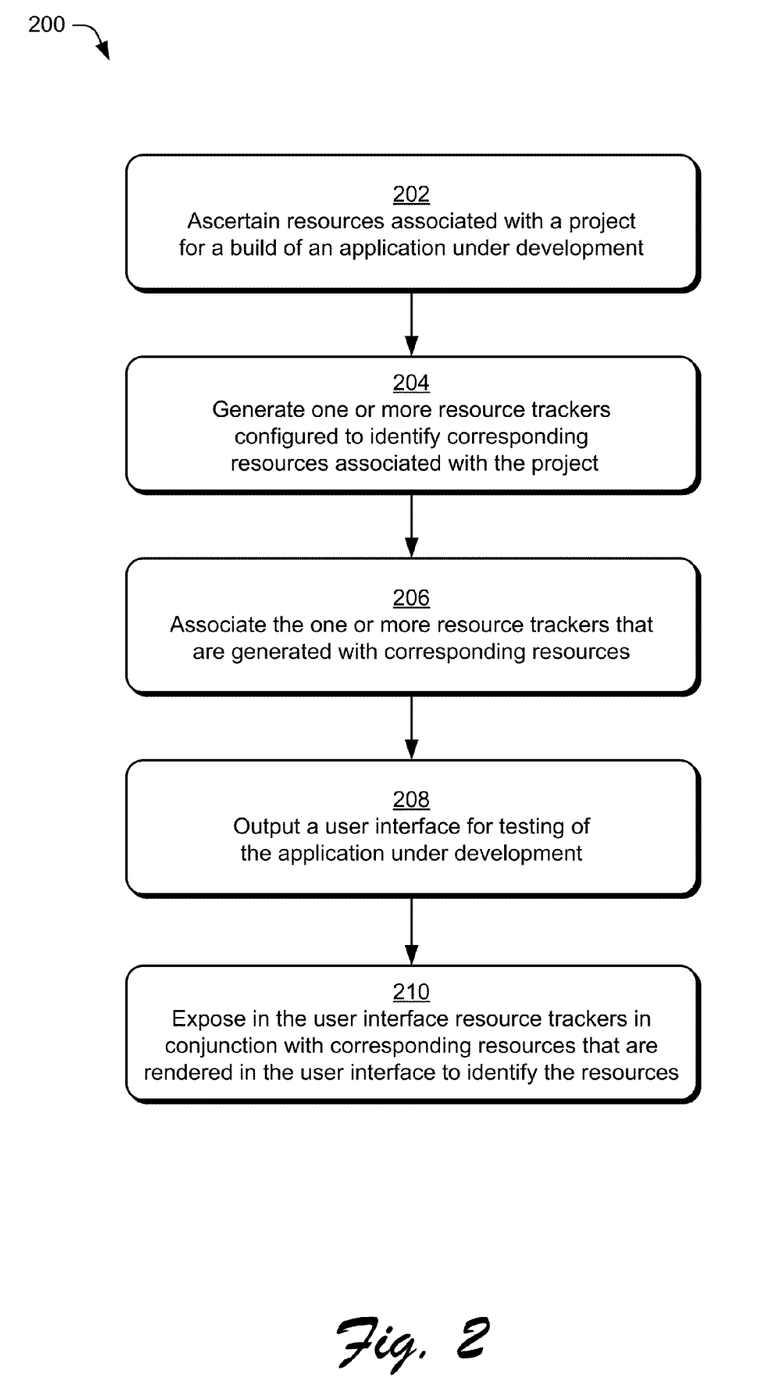
FIG. 2 is a flow diagram depicting an example procedure to generate and use resource trackers for tracking resources during testing.

FIG. 2 depicts a procedure 200 in an example implementation in which resource trackers are associated with resources of a project. Resources are ascertained that are associated with a project for a build of an application under development (block 202). For instance, a development module 112 may provide an IDE that a developer may employ to develop an application. In accordance with techniques described herein the development module 112 may include a resource tracker module 118 to facilitate tracking of resources 116. The resource tracker module 118 may be configured to process resources 116 in connection with different operations 124. As part of this processing, tracking of the resources may be triggered. For example, a configurable setting may enable a developer to selectively toggle resource tracking on and off for different operations in the development process. A control (e.g., a toggle button, menu item, gesture, keystroke, etc.) operable to initiate tracking on-demand may also be provided. In response to a particular operation 124 and/or selection of a control to initiate tracking, the resource tracker module 118 may be configured to enumerate resources associated with the current project. This may involve referencing a table, file, database or other suitable data source that lists resources associated with the project. The resource tracker module 118 may then cycle through a list of enumerated resources to produce resource trackers 120 for each resource.

In particular, one or more resource trackers configured to identify corresponding resources associated with the project are generated (block 204) and the one or more resource trackers that are generated are associated with corresponding resources (block 206). Resource trackers 120 may be generated in a designated format and associated with resources in any suitable way. A variety of different formats for the resource trackers are contemplated. In at least some embodiments, user-supplied input is combined with defined resource identifiers in manner that produces distinguishable resource trackers for each resource, across different projects. In another approach, the resource tracker module 118 may be configured to randomly generate and assign distinct identifiers that may be used as resource trackers. For example, random alphanumeric combinations may be generated and assigned to resources when resources are created and/or in response to different operations 124 perform upon the resource. Still further, the resource tracker module 118 may look-up and retrieve suitable identifiers that are produced by a development module 112 or another source and assign the retrieved identifiers as resource trackers 120. For example, random keys may be associated individually with resources by the development module 112 when resources are defined. Thus, suitable resource trackers may be derived using a variety of techniques and formats.

A user interface is output for testing of the application under development (block 208) and resource trackers are exposed in the user interface in conjunction with corresponding resources that are rendered in the user interface to identify the resources (block 210). For example, a testing mode provided by the development module 112 may enable a developer to view resources 116 for a project 114 as the resources are configured to appear within user interfaces 122 of corresponding applications 110. Moreover, in accordance with techniques described above and below, resource trackers 120 associated with resources that are displayed in a user interface may be selectively exposed to facilitate identification of the resources and/or troubleshooting of the project.

By way of example, resource trackers 120 may be added to text strings rendered in different portions and/or fields of a user interface 122. This may assist a developer in identifying strings that are rendered incorrectly, truncated, stretched, or otherwise appear different than expected. Further, resource trackers may be applied not only to text strings, but also to other types of resources 116 including but not limited to images, script, forms, pages, tabs, controls, menus and menu items, links, files, and other types of resources typically used to develop applications. Thus, the exposed resource trackers 120 enable a developer to test and detect problems with many different kinds of content and resources. The resource trackers may also be employed to test behaviors for controls, fields, pages, and other rendered content items by checking responses of tracked resources to different inputs that trigger the behaviors. Additional details and aspects of resource tracker techniques are discussed in relation to the following figures.

Figure 3:
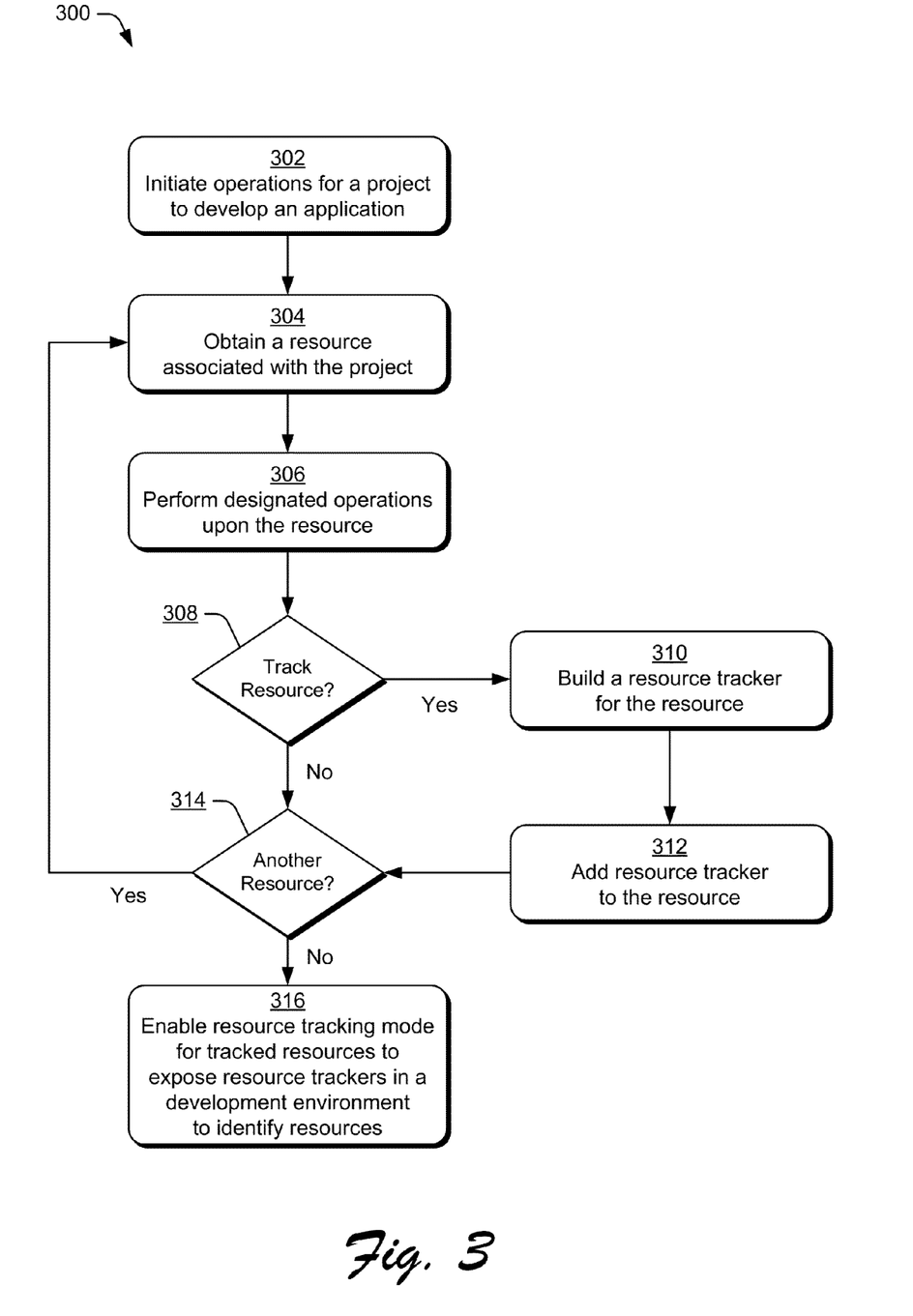
FIG. 3 is a flow diagram depicting an example procedure to produce resource trackers for each resource in a project.

FIG. 3 depicts a procedure 300 in an example implementation in which resource trackers may be selectively built for resources associated with an application development project. Operations are initiated for a project to develop an application (block 302). A resource associated with the project is obtained (block 304) and designated operations are performed upon the resources (block 306). Here, a developer may provide input to initiate a particular operation 124 in connection with a build of an application. For example, the development module 112 may provide various controls, menus, and/or tools to facilitate application development. Interaction with the development module 112 may initiate selected operations in the course of using an IDE to produce an application. At least some operations 124 may involve resource-by-resource processing. As part of such processing, a resource tracker module 118 may be invoked to build resource trackers 120 for the resources 116 that may be used to identify the resource throughout the IDE. Generally, the resource tracker module 118 may be configured to cycle through resource associated with a project one at a time and create appropriate resource trackers for the resources.

By way of example and not limitation, resource trackers may be generated and assigned to resources 116 when the resources are compiled by a compiler associated with the IDE. In another example, an IDE may incorporate a translation toolkit designed to facilitate translation of resources into different language to produce multi-lingual versions of an application. In some embodiments, resource trackers 120 may be generated as part of translation of the resources into one or more different languages using such a translation toolkit. In yet another example, the resource tracker module 118 may be configured to operate in response to rendering operations to render resources for display in a user interface. One or more resource trackers 120 may be added to selected resources at render-time as part of the rendering operations. Various other operations 124 that may initiate creation of resource trackers 120 are also contemplated. Further, generation of resource trackers may be triggered on-demand in response to designated input, such as selection of a tracking control, toolbar item, or menu item, and/or in response to other triggering inputs.

A determination is made regarding whether to track the resource (block 308). The determination may be made in various ways. In one approach, tracking may be selectively toggled on or off. In this case, the determination involves determining whether tracking is enabled or disabled on a global basis. In addition, tracking may be set individually for different resource types. For example, tracking may be enabled for text strings and disabled for images and/or other types of content. Thus, the determination may include checking the resource type and ascertaining whether tracking is enabled/disabled for particular resource types.

When tracking is enabled for the resource, a resource tracker is built for the resource (block 310) and the resource tracker is added to the resource (block 312). As mentioned various different techniques and formats may be used to generate resource trackers. Details regarding example techniques to build resources trackers, associate the resource trackers with resources, and employ the resource trackers in a development environment are discussed in relation to FIGS. 4-6.

After producing a resource tracker or when tracking for a resource is disabled per block 308, a determination is made regarding whether another resource exists for the project (block 314). If another resource exists, the process to selectively build resource trackers represented by block 304 to block 312 is repeated for the next resource. After each resource has been processed per block 314, a resource tracking mode is enabled for tracked resources to expose resource trackers in a development environment to identify resources (block 316). For instance, resource trackers 120 may be presented along with corresponding resources within a user interface that is tested through an IDE. Resource trackers 120 may also be exposed within lists and UIs used to define, edit, manage, and otherwise interact with resources for a project in the IDE.

Figure 4:
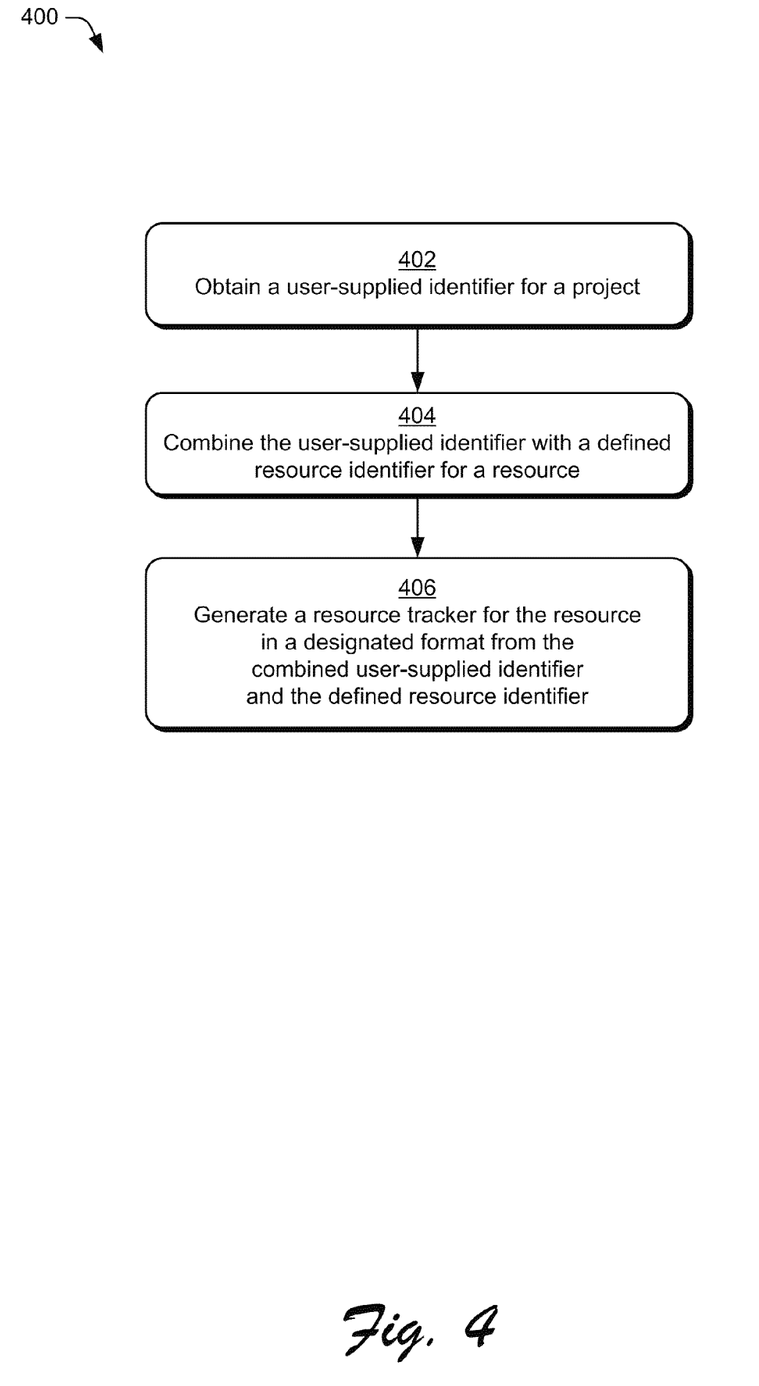
FIG. 4 is a flow diagram depicting an example procedure to use multiple different identifiers to create a resource tracker for a resource.

FIG. 4 is a flow diagram depicting a procedure 400 in an example implementation in which resource trackers may be built. In particular, the procedure 400 represents an example technique in which a resource tracker is derived from a combination of a user-supplied identifier and a defined identifier for a resource. The procedure represents one example way in which a resource tracker may be built per block 310 in the example procedure 300 of FIG. 3.

In particular, a user-supplied identifier for a project is obtained (block 402). For example, a prompt to enter a project specific identifier such as a project name, code, or tag may be output by the resource tracker module 118 to solicit input of a user-supplied identifier when a project is created, when resource tracking is initiated for the project, or otherwise. Generally, a developer may input different names for different projects to distinguish projects from one another. Thus, an existing name or other comparable ID associated with a project may be obtained and employed in some scenarios to generate a resource tracker for the project. In addition or alternatively, a developer may be prompted to enter an alphanumeric string as a user-supplied identifier that the resource tracker module 118 is configured to use primarily and/or exclusively for producing resource trackers. Thus, the user-supplied identifier may be explicitly input in connection with creating resource trackers for a project.

The user-supplied identifier is combined with a defined resource identifier for the resource (block 404). Then, a resource tracker is generated for the resource in a designated format from the combined user-supplied identifier and the defined resource identifier (block 406).

For example, the development module 112 may be configured to assign resource specific identifiers to resources 116 that are defined for a project 114. The resource specific identifiers may be configured in various ways. For example, resources for a project may be sequentially numbered within each project and the sequential numbers may be used as defined resource identifiers. In another approach, other identifying information such as resource names, code fields, and/or key values defined for resources may be employed as defined resource identifiers. Resource specific identifiers may distinctly identify a resource within a given project, but such identifiers may not be distinct across multiple active projects and/or for different versions of the resources within a project.

In general, a resource tracker may be generated that reflects a combination of at least two different inputs. At least one of the inputs may be configured as a user-supplied identifier for a project. Both user-supplied identifiers and the defined resource identifiers may be configured as any suitable alphanumeric strings. In at least some embodiments, designated string lengths may be established for both the user-supplied and defined identifiers. Combining user-supplied identifiers with defined resource identifiers ensures that distinct resource trackers are generated for resources across different projects (to a probabilistic degree of certainty based on size/length of the resource trackers).

To produce a resource tracker, two or more input identifiers may be combined and processed in accordance with a selected algorithm to generate a resource tracker in a format designated by the algorithm. The algorithm may be configured to combine input identifiers in various ways to create a combined identifier. In one approach, the resource tracker module 118 implements an application programming interface (API) to accept the two or more input identifiers and apply a selected algorithm to generate a corresponding resource tracker.

For example, the input identifiers may be combined by a concatenation operation. In another approach, an insertion operation may be used to insert one identifier into another at a designated position. In a further example, a combined identifier may be constructed by alternating characters of two or more input identifiers. Different algorithms may therefore be defined to combine two or more input identifiers in these or other designated ways. The combined identifier may be configured as an alphanumeric string having a corresponding string length. In some scenarios, the combined identifier may be used directly as a resource tracker for a corresponding resource. For example, the combined identifier may be used for some resource lists and database views.

However, in some cases the string length of the combined identifier may make it cumbersome to use the combined identifier directly. For instance, displaying long strings during user interface testing may be impracticable and/or may distort the testing. Thus, in some embodiments further processing may occur to transform the combined identifier into a designated format. The designated format may define at least a configurable string length for resource trackers. The string length selected for resource trackers may be adjusted to balance the probability of having distinct trackers (e.g., collision-protection) against having an acceptable string length for display of resource trackers. In at least some embodiments, the algorithm is configured to process a combined identifier to extract or generate a resource tracker having a selected length. To do so, the algorithm may apply a hash function to the combined identifier to produce a resource tracker having a selected length. Various hash functions may be employed to implement the described techniques including but not limited to MD5, SHA-1, and HMAC implementations.

In one particular example, the resource tracker module 118 implements an algorithm that is configured to concatenate a user-supplied identifier with a defined resource identifier provided as input to produce an alphanumeric, concatenated string. A hash function may then be applied to the concatenated string. In particular, the resulting alphanumeric, concatenated string is converted to a byte array. A hash value for the byte array is computed using a selected hash function, such as MD5. The resulting hash value that is obtained is also configured as a byte array. Accordingly, the hash value produced by the hash function may be converted from a byte array back into a corresponding alphanumeric string representing the hexadecimal value of the hash. This alphanumeric string derived from the hash value may be readily reproducible using the same input to the hash function. Thus, alphanumeric strings constructed in this manner may be used reliably as resource trackers 120 to distinguish between different resources. Such resource trackers may be associated with resource in various ways as discussed in relation to the following figure.

Figure 5:
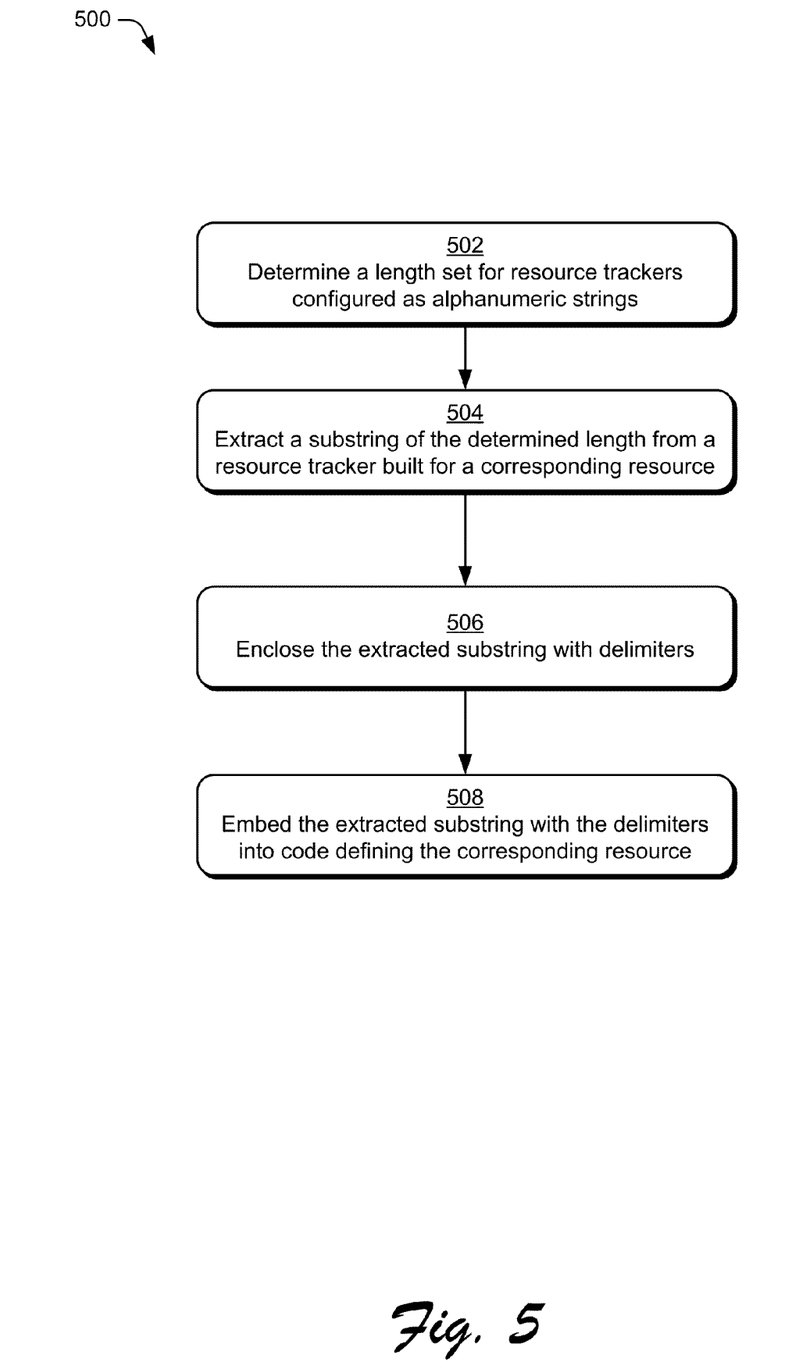
FIG. 5 is a flow diagram depicting an example procedure to associate resource trackers with corresponding resources.

FIG. 5 is a flow diagram depicting a procedure 500 in an example implementation in which a resource tracker may be added to a resource. In particular, the procedure 500 represents an example technique in which a resource tracker configured as an alphanumeric value may be associated with a corresponding resource. The procedure represents one example way in which a resource tracker may be added to a resource per block 312 in the example procedure 300 of FIG. 3.

A length is determined for resource trackers configured as alphanumeric strings (block 502). Here, the length of resource trackers generated in accordance with procedure 400 of FIG. 4 may be further adjusted to facilitate testing and control how the resource trackers are displayed within user interfaces. For example, a default length set for resource trackers may be adjusted to modify padding of text that is displayed in portions of a user interface to trigger corresponding behaviors. Thus, the actual length used or displayed for different operations may be adjusted. The shortened substring value may be sufficient to distinguish between resources or at least scope down to just a few possible options in most scenarios. The shortened substring may be used to reduce the amount of screen real estate used to display the resource trackers during testing. In some cases, the substring length that is set may match the length or resource trackers as generated per FIG. 4. In this case, the full alphanumeric string of constructed resource trackers is used for tracking purposes.

A substring of the determined length is extracted from a resource tracker built for a corresponding resource (block 504). For instance, the resource tracker module 118 may operate to extract a substring from resource trackers generated in accordance with procedure 400 of FIG. 4. The substring may be extracted as a selected number of characters at a set location within the full string. The substring may alternatively be extracted at a randomly selected location.

Depending upon the length that is designated, the full alphanumeric string or just a portion thereof may be extracted.

The extracted substring is enclosed in delimiters (block 506) and the extracted substring with the delimiters is embedded into code defining the corresponding resource (block 508). The delimiters may be used as visual indicators of a resource tracker contained within the delimiters. In addition, a renderer or other tool used to process resources may be configured to parse code to detect the delimiters and recognize resource trackers contained within the delimiters. The resource trackers that are recognized may then be handled accordingly by the system. Various different kinds of delimiters to signal resource trackers may be employed examples of which include brackets, designated tags, asterisks, colons, or other suitable delimiters.

Delimited resource trackers may be associated with a corresponding resource in various ways. For example, resource trackers may be added as parameters in metadata associated with resources, such as within a header of a document defining a resource. Resource trackers may also be inserted as content for a given resource. For example, in some embodiments resource trackers may be appended, prepended, or otherwise inserted as strings into text strings of corresponding resources. In the case of an image, a resource tracker may be included as image metadata or a tag for the image. In addition or alternatively, resource trackers may also be linked to a project and resource as fields, metadata, or tags that may be selectively referenced and displayed when resources are presented. Further details regarding suitable resource trackers and some example ways in which resource trackers may be employed are discussed in relation to the following figure.

Figure 6:
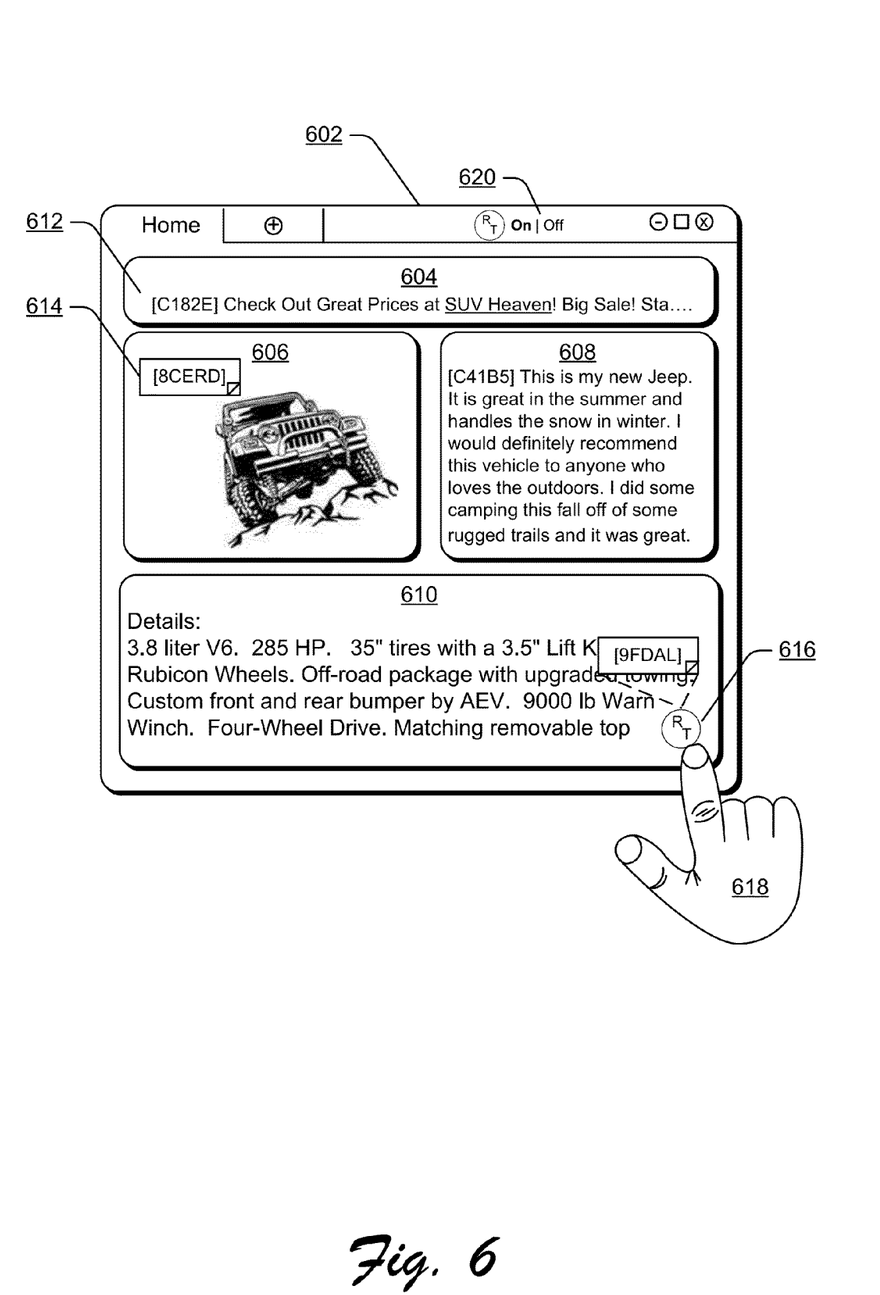
FIG. 6 is a diagram depicting an example user interface that employs resource trackers in accordance with one or more embodiments.

FIG. 6 is an example diagram depicting generally at 600 an example user interface 602 undergoing testing in accordance with one or more embodiments. In the depicted example, the user interface 602 includes various portions in which respective resources are rendered and displayed via the user interface. For example, the user interface is depicted as presenting an advertisement in an ad portion 604, an image in an image portion 606, a comment regarding the image in a comment portion 608, and some details associated with the image in a details portion 610.

Various different examples of resource trackers 120 are also depicted with respect to the various portions of the user interface 602. For example, an example resource tracker is illustrated at 612 for the ad portion 604. Here, the resource tracker is illustrated as being prepended to a text string for the ad. In this example, note that the text string has been truncated. Thus, the prepended resource tracker in this case enables the developer to trace the resource back to where it is defined in code to address the truncation issue that is visible in the user interface 602.

Another example of a resource tracker is illustrated at 614 in connection with the image portion 606. In this example, the resource tracker is illustrated as being shown by way of an overlay tag or note rendered over the image. Such an overlay tag may be rendered statically in association with a resource. In addition or alternatively, overlay tags for resource trackers may selectively appear in response to different triggers. For example, the example overlay tag may appear when a cursor is hovered over the image or when the image is selected. A toggle control may also be provided to selectively turn display of overlay tags and/or other types of resource trackers on and off for multiple resources. The resource tracker presented via the example overlay tag may be associated as metadata or a field with the image that is referenced when the image is rendered. The overlay tag may also be rendered based upon an underlying resource tracker that is inserted as delimited value within code defining the image as previously discussed.

Another possible implementation of resource tracker is shown at 616 in relation to the details portion 610. In this case, a resource tracking control such as the example "RT" icon in FIG. 6 may displayed with tracked resources. The resource tracking control may be selectable to expose a corresponding resource tracker for a resource. For instance, the resource tracker "9FDAL" is illustrated as being selectively display in response to a user's hand 618 providing touch input to operate the resource tracking control. Other types of controls and/or different input may be employed to selectively show resource trackers 120 in a comparable manner.

Resource tracking features may also be selectively turned on and off in some scenarios. By way of example a resource tracking toggle control 620 is depicted in FIG. 6 that may be operated to selectively show and hide resource tracker 120 in the user interface 602. In the example, the toggle is set to "On" and thus the various example resource trackers in FIG. 6 are enabled. Setting the toggle to "Off" may disable the resource trackers and cause the user interface to be rendered again without displaying the resource trackers.

As mentioned, resource trackers are configured to identify corresponding resources and provide a mechanism for developers to trace back to resources as defined in underlying code to troubleshoot any problems or otherwise make changes to the resources. The resource trackers may be configured as static text. In this case, a developer may use the displayed strings for resource trackers to conduct a search for a corresponding resource in code. The search may be conducted by cutting and pasting a particular string into a search tool or by manually typing in the string.

In at least some embodiments, the resource trackers may be configured as links that enable automatic navigation to corresponding locations within code that define associated resources. Accordingly, to navigate back to the definition of a resource in code for a project, a developer may be able to simply select a displayed resource tracking link presented with a user interface during testing.

Resource trackers as described herein may have many applications. For example resource trackers may assist in disambiguating resources from user inputs and or other data during testing. For example a string such as "UserName: Fred Thomlinson" that is displayed with a resource tracker as "[fasdf][UserName]: Fred Thomlinson" may distinguish the resource "UserName" from the input value "Fred Thomlinson." Resource trackers are also useful for programmatically concatenated strings for which it might otherwise be difficult or impossible to trace back to underlying resources. For example, a concatenated string "port:usb" may be represented with resources trackers as "[asdf][[fd32][port]:[3423j][usb]]", which enables a developer to recognize the concatenated string and/or resources from which the string is derived.

The resource trackers may also be employed to facilitate various tracking techniques and automated tools throughout an IDE. This may include for example hit trackers and debugging tools configured to make use of resource trackers to log interactions with resources during testing and/or errors associated with underlying resources. In addition, testing tools may make use of resource trackers to keep track of calls made to and from various resources in different scenarios. A variety of other examples of automated tools that may leverage resource trackers described herein are also contemplated.

Having considered some example details regarding resource tracker techniques, consider now an example system that may be employed to implement the techniques in accordance with one or more embodiments.

Example System

Figure 7:
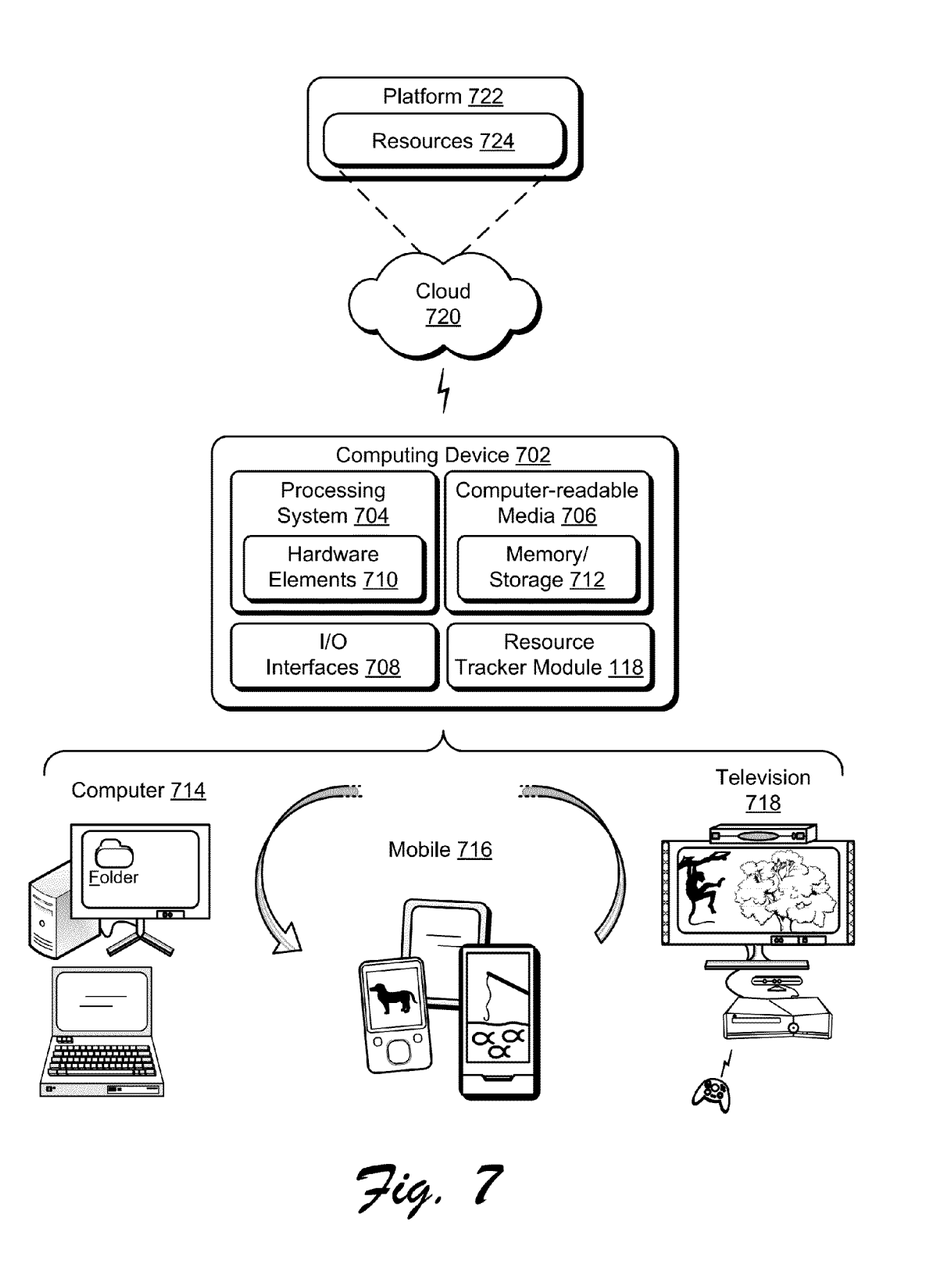
FIG. 7 illustrates an example system and components of the system that can be employed to implement embodiments of the techniques described herein.

FIG. 7 illustrates an example system 700 that includes an example computing device 702 that is representative of one or more computing systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "communication media."

Computer-readable storage media" may refer to media and/or devices that enable persistent storage of information in contrast to mere signal transmission, carrier waves, or signals per se. Thus, computer-readable storage media does not include signal bearing or transitory media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 702, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including operating system 108, applications 110, development module 112, resource tracker module 118 and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. Program modules may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device comprising:
    ascertaining resources associated with a project for a build of an application under development;
    generating one or more resource trackers configured to identify corresponding resources associated with the project by concatenating a user-supplied identifier for the project with defined resource identifiers for each of the ascertained resources to produce concatenated strings used to derive respective resource trackers for the ascertained resources;
    associating the one or more resource trackers that are generated with corresponding resources by embedding the resource trackers within code defining the corresponding resources;
    outputting a user interface for testing of the application under development;
    exposing in the user interface resource trackers in conjunction with corresponding resources that are rendered in the user interface to identify the resources.

2. A method as described in claim 1, further comprising obtaining the user-supplied identifier for the project for combination with the defined resource.

3. A method as described in claim 1, wherein the method is performed via a resource tracker provided as a component of an integrated development environment (IDE).

4. A method as described in claim 1, wherein the resource trackers are configured as alphanumeric strings having a configurable length.

5. A method as described in claim 1, wherein the resources include at least some text strings and resource trackers corresponding to the text strings are inserted as alphanumeric strings into respective text strings.

6. A method as described in claim 1, wherein embedding the resource trackers within the code defining the corresponding resources includes delimiting at least some resource trackers to enable recognition of the resource trackers within the code.

7. A method as described in claim 1, wherein at least some of the resource trackers exposed in the user interface are configured as links operable to automatically navigate to locations in code defining corresponding resources.

8. A method as described in claim 1, wherein generating the one or more resource trackers comprises randomly generating distinct identifiers for each ascertained resource.

9. A method as described in claim 1, wherein the ascertaining, generating, and associating are performed as part of a translation operation to translate resources associated with the project into one or more different languages.

10. A method as described in claim 1, wherein generating the one or more or more resource trackers comprises determining a string length set for resource trackers and creating resource trackers for the ascertained resources having the determined string length.

11. A method as described in claim 1, wherein generating the one or more resource trackers comprises, for each particular resource that is ascertained:
applying a hash function to the concatenated string to compute a hash value; and
converting the hash value to create an alphanumeric string used to derive a resource tracker for the particular resource.

12. A method as described in claim 11, wherein associating the one or more resource trackers that are generated with corresponding resources comprises, for each particular resource that is ascertained;
extracting a substring of a designated length from said alphanumeric string that is created for the particular resource; and
prepending the substring that is extracted to a text string for the particular resource.

13. One or more computer-readable storage media storing instructions that, when executed by a computing device, implement a resource tracker module configured to perform operations to generate a resource tracker to identify a resource included in a project for a build of an application within an integrated development environment (IDE) comprising:
obtaining a user-supplied identifier associated with the project;
concatenating the user-supplied identifier with a defined resource identifier for the resource to produce a concatenated string associated with the resource;
applying a hash function to the concatenated string to compute a hash value; and
converting the hash value to create an alphanumeric string used to derive the resource tracker for the resource; and
embedding the resource tracker within code defining the resource.

14. One or more computer-readable storage media as described in claim 13, wherein resource tracker module is configured to generate the resource tracker in connection with translation of the resource into one or more languages.

15. One or more computer-readable storage media as described in claim 13, wherein embedding the resource tracker further comprises:
determining a substring length set for the resource tracker;
extracting a substring from the alphanumeric string created for the resource having the determined substring length; and
inserting the substring into code defining the resource as the resource tracker.

16. One or more computer-readable storage media as described in claim 13, wherein the resource tracker module is further configured to perform operations comprising: selectively displaying the resource tracker in conjunction with the resource when the resource is rendered in a user interface output for testing of the application.

17. A computing device comprising:
a processing system;
one or more modules operable at least in part via hardware of the processing system to implement a resource tracker for an integrated development environment (IDE) configured to:
generate resource trackers for resources associated with an application development project configured to identify the resources throughout the IDE by concatenating a user-supplied identifier for the application development project with resource specific identifiers for the resources defined by the IDE;
embed the resource trackers that are generated into code defining the resources; and
display the resource trackers in conjunction with the resources when the resources are presented within user interfaces output to enable interaction with the resources.

18. The computing device of claim 17, wherein at least some of the resource trackers are configured as selectable links operable to navigate to a location in code defining respective resources.

19. The computing device of claim 17, wherein insertion of the resource trackers comprises inserting at least one resource tracker as an alphanumeric string within a text string of a corresponding resource.

20. The computing device of claim 17, wherein display of the resource trackers in conjunction with the resources comprises listing the resource trackers along with corresponding resources in a list of the resources output by the IDE to facilitate management of the resources for the application development project.

* * * * *